United States Patent [19]
Hempel

[11] Patent Number: 6,058,794
[45] Date of Patent: May 9, 2000

[54] COMPOSITE SECTOR GEAR AND METHOD FOR MANUFACTURING SAME

[75] Inventor: Chad C. Hempel, Pewaukee, Wis.

[73] Assignee: Accurate Specialties, Inc., Waukesha, Wis.

[21] Appl. No.: 08/847,146

[22] Filed: Apr. 30, 1997

[51] Int. Cl.[7] .................. F16H 55/00; B22D 19/00
[52] U.S. Cl. .................. 74/439; 74/446; 164/98; 29/893
[58] Field of Search ................. 164/98; 74/439, 74/446, 89.18; 29/893, 893.37

[56] References Cited

U.S. PATENT DOCUMENTS

| | | | |
|---|---|---|---|
| 1,212,608 | 1/1917 | Calkins | 74/446 |
| 1,828,271 | 10/1931 | Arnold | 29/893.37 |
| 1,994,634 | 3/1935 | Broughton | 22/212 |
| 2,231,427 | 2/1941 | Larsh et al. | 22/203 |
| 2,720,119 | 10/1955 | Sherman | 74/460 |
| 2,757,426 | 8/1956 | Brennan | 22/193 |
| 3,266,099 | 8/1966 | Bucy | 18/42 |
| 3,472,308 | 10/1969 | Lauth | 164/71 |
| 3,528,478 | 9/1970 | Koch et al. | 164/113 |
| 3,546,959 | 12/1970 | Carlson | 74/439 |
| 3,557,423 | 1/1971 | Wolfe et al. | 74/446 |
| 3,685,572 | 8/1972 | Carver et al. | 164/312 |
| 3,757,472 | 9/1973 | Rogakos | 49/40 |
| 3,861,231 | 1/1975 | F'Geppert | 74/410 |
| 3,867,852 | 2/1975 | Schöpf | 74/446 |
| 3,905,415 | 9/1975 | Lefebvre | 164/72 |
| 4,059,143 | 11/1977 | Morita et al. | 164/113 |
| 4,078,445 | 3/1978 | Kiser, Jr. | 74/243 R |
| 4,589,860 | 5/1986 | Brandenstein et al. | 474/161 |
| 4,677,870 | 7/1987 | Alshareedah | 74/431 |
| 5,271,287 | 12/1993 | Wadleigh | 74/439 |
| 5,452,622 | 9/1995 | Fenelon | 74/411 |

FOREIGN PATENT DOCUMENTS

| | | | |
|---|---|---|---|
| 70.42262 | 7/1972 | France | 164/98 |
| 1470438 | 4/1989 | U.S.S.R. | 164/98 |
| 1590765 | 9/1990 | U.S.S.R. | 74/446 |
| 327376 | 4/1930 | United Kingdom | 74/446 |
| 90/14254 | 11/1990 | WIPO | 74/439 |

OTHER PUBLICATIONS

Serope Kalpakjian, Manufacturing Engineering and Technology, Third Edition, Addison–Wesley Publishing Company, pp. 289 and 292, 1995.

Primary Examiner—David A. Bucci
Assistant Examiner—William C Joyce
Attorney, Agent, or Firm—Michael Best & Friedrich LLP

[57] ABSTRACT

A cast composite sector gear including a hub made of a first material and an outer gear section made of a second material that is cast onto the hub. The hub is configured such that a secure mechanical bond can be created between the hub and the gear section when the gear section is cast onto the hub. The hub includes a base having a peripheral surface and a gear foundation that extends circumferentially from the peripheral surface about a portion of the base. The gear section is cast onto the gear foundation, and the gear section extends circumferentially about a portion of the hub.

25 Claims, 2 Drawing Sheets

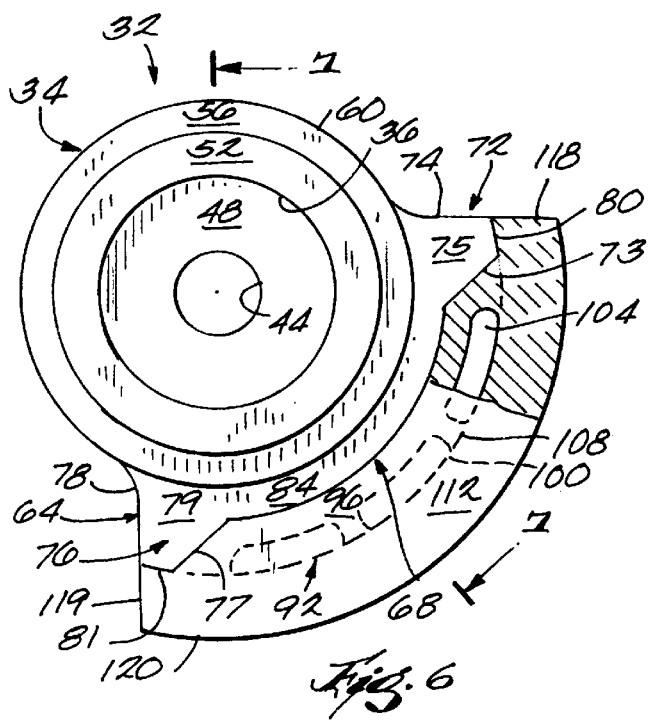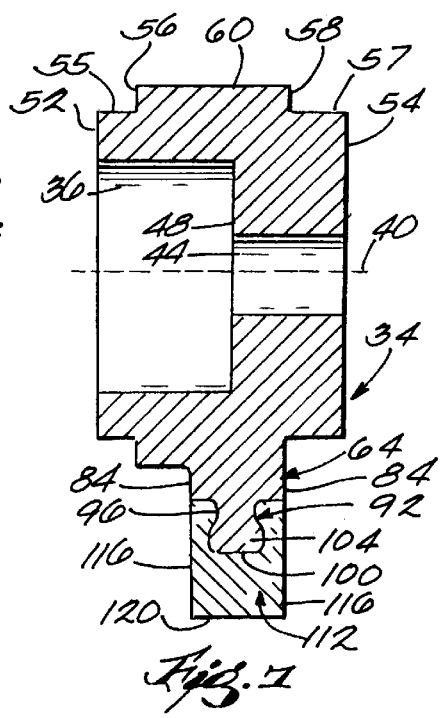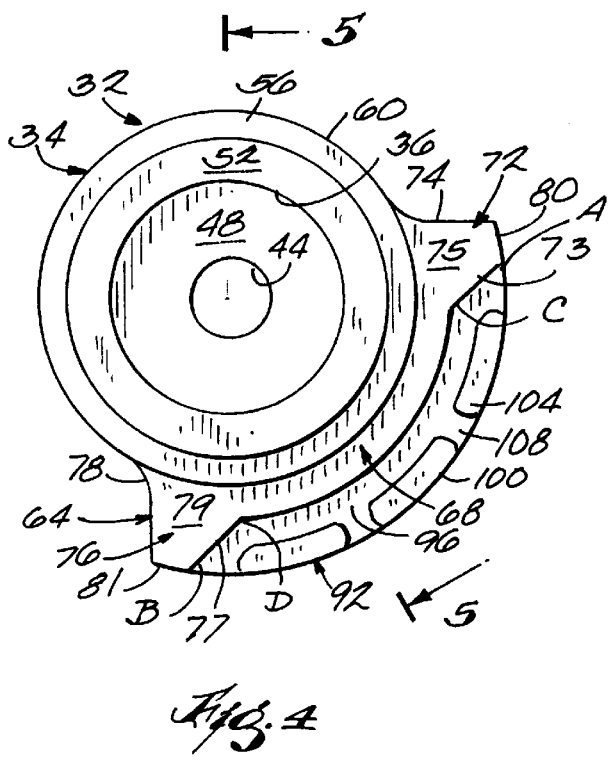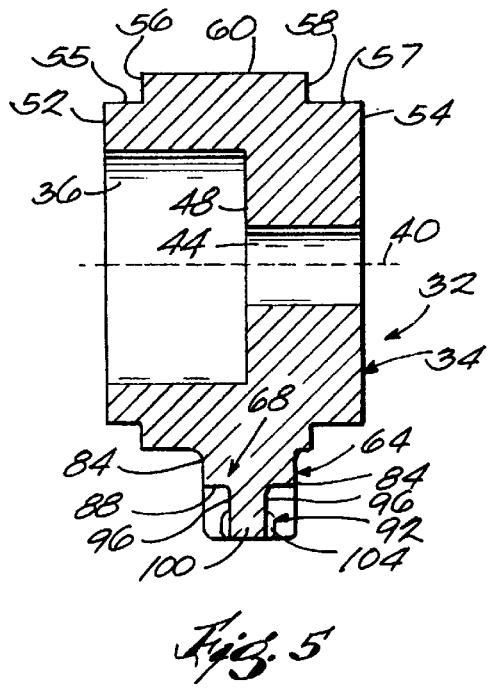

COMPOSITE SECTOR GEAR AND METHOD FOR MANUFACTURING SAME

FIELD OF THE INVENTION

The present invention relates to sector gears, and more particularly to cast composite sector gears and a method for manufacturing the same.

BACKGROUND PRIOR ART

The fabrication of wheel shaped composite gears and sprockets including a combination of a grey iron hub surrounded by an outer annulus of a softer, machinable material, such as plastic or bronze, extending from the outer surface of the hub is generally known. The provision of a grey iron hub for such a composite gear provides a hard material that is suitable for many applications. Grey iron is not as suitable as other materials for use as the outer portion of a gear having precisely formed gear teeth because it is relatively brittle and does not intermesh well with an opposing gear and can corrode. Nevertheless, the use of iron substantially reduces the cost of the composite gear if compared to the cost of a gear made entirely of a standard gear outer portion material such as bronze. Also, provision of a bronze annulus cast onto the hub is desirable because bronze does not easily corrode and forms well with an intermeshing gear. The use of a casting method to interconnect a hub and surrounding annulus, rather than other mechanical methods of interconnecting, is known and desirable as an efficient method to interconnect the hub and annulus.

In such composite gears, the outer annulus of bronze is typically cast onto the hub such that it surrounds the peripheral surface of the hub. The annulus is securely fixed to the hub through the mechanical bond that is created due to the circular, or surrounding nature of the annulus in relation to the hub. The annulus is held on the hub through the mechanical bond that is formed between the hub and the annulus due to the fact that the annulus surrounds the hub.

Sector gears, or quadrant gears, are gears that resemble a portion of a wheel shaped gear containing the hub and only a portion of the outer annulus. The annulus of a sector gear does not completely surround the peripheral surface of the hub. Sector gears in which the annulus and the hub are made of a single material are generally known. Composite sector gears wherein the annulus is made of a different material from the hub can be produced by attaching the annulus to the hub with bolts or screws, but such methods of production are very inefficient.

SUMMARY OF THE INVENTION

It is not known in the art to use cast composite gear configurations in the fabrication of sector gears. In the fabrication of sector gears, the use of a combination of dissimilar metallic materials, such as the combination of grey iron and bronze, is generally not used in a casting process because it has been difficult to achieve a bond between the two materials. This is because the bronze and the grey iron will not form a metallurgical bond, and adhesives or other known mechanical bonds are not sufficiently secure to fix an annular portion of a sector gear made of bronze to a grey iron hub. Additionally, the annulus, or gear section, of a sector gear does not completely surround the hub. Therefore, the mechanical bond that is created in wheel shaped cast composite gears and sprockets wherein the annulus surrounds the hub is not present in sector gear configurations.

Nevertheless, the use of casting for formation of cast composite sector gears including a combination of dissimilar metallic materials, such as grey iron and bronze is desirable.

The invention provides a cast composite sector gear and a method for the fabrication of the same. In general, the invention provides a new design for a composite sector gear including a hub, or inner portion, made of a first material, such as grey iron, and an outer gear section made of a second material, such as bronze, that is cast onto the hub. The hub is configured such that a secure mechanical bond can be created between the hub and the gear section when the gear section is cast onto the hub.

One embodiment of the invention provides a composite sector gear including a hub made of a first material, and a gear section having a pair of spaced apart ends. The gear section is made of a second material different from the first material and is cast onto the hub.

Another embodiment of the invention provides the hub including a base having a peripheral surface and a gear foundation that extends circumferencially from the peripheral surface about a portion of the base. The gear section is cast onto the gear foundation, and the gear section extends circumferencially about a portion of the hub.

Another embodiment of the invention provides a composite sector gear prepared by a method. The method includes providing a hub made of a first material, and casting onto the hub a gear section having spaced apart ends. The gear section is made of a second material different from the first material. In another embodiment the process includes providing a hub including a base and a peripherally extending gear foundation that extends about a portion of the base, and casting onto the gear foundation a gear section made of a second material different from the first material.

The invention also includes a method for producing a composite sector gear. The method includes providing a hub made of a first material, casting onto the hub a gear section having spaced apart ends and being made of a second material different from the first material.

One feature and advantage of the invention is to provide a cast composite sector gear made of two dissimilar materials wherein one material is cast onto the other material.

Another feature and advantage of the invention is to provide a method of manufacturing such composite sector gears.

Another feature and advantage of the invention is to provide a composite sector gear that is reduced in cost compared to the cost of the gear made entirely of a material such as bronze.

Another feature and advantage of the invention is to provide a composite sector gear that includes an outer gear section that is machinable to form the teeth or cogs of a gear or sprocket.

Another feature and advantage of the invention is to provide a composite sector gear, including a grey iron hub and a bronze periphery cast onto the hub.

Another feature and advantage of the invention is to provide a method for forming a mechanical bond between the iron hub of a sector gear and the bronze periphery of a sector gear that is cast onto the hub.

Another feature and advantage of the invention is to provide a composite sector gear that retains the cost and machinability advantage of using composite materials.

Before embodiments in the invention are explained in detail, it is to be understood that the invention is not limited in its application to the details of the construction and the arrangements of components set forth in the following description. The invention is capable of other embodiments that are being practiced or being carried out in various ways. Also, it is understood that the phraseology and terminology used herein is for the purpose of description and should not be regarded as limiting.

BRIEF DESCRIPTION OF THE DRAWINGS

FIG. 4 is a side view of the hub shown in FIG. 3.

FIG. 5 is a cross sectional view of the hub along lines 5—5 of FIG. 4.

FIG. 6 is a partial cut away side view of the composite sector gear.

FIG. 7 is a cross sectional view of the composite sector gear along line 7—7 of FIG. 6.

DETAILED DESCRIPTION OF AN EMBODIMENT

The invention provides a composite sector gear that includes dissimilar materials that are mechanically bound together to form a sector gear through casting. The invention also includes a method for manufacturing the composite sector gear.

Figure 1:
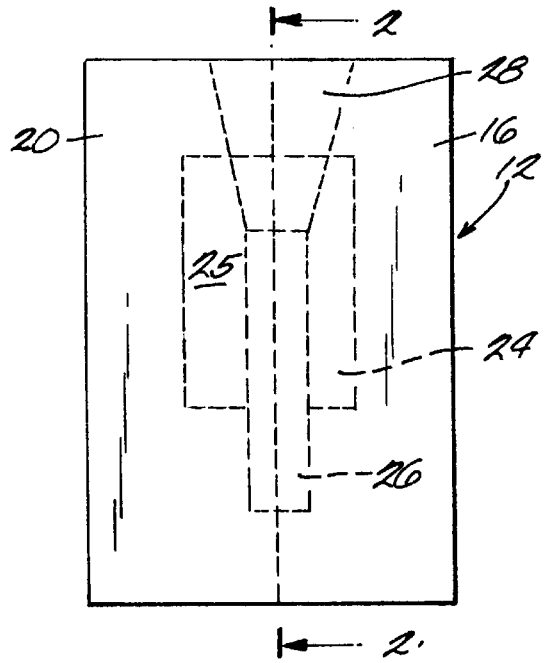
FIG. 1 is an elevational view of a mold showing an interior cavity and a feeding channel in phantom.

FIGS. 1–7 illustrate one embodiment of the invention. As illustrated in FIG. 1, a prefabricated casting mold 12 is provided of the type that may be utilized to practice the method of the present invention. The casting mold 12 includes a first half or cope 16 and a second half or drag 20. The cope 16 and the drag 20 are fitted together such that they form a cavity 24, and a feeding channel 28, both shown in phantom. The mold 12 is fabricated of materials and through methods that are generally known in the art of metallurgical casting, and more specifically in the art of sand casting.

Figure 2:
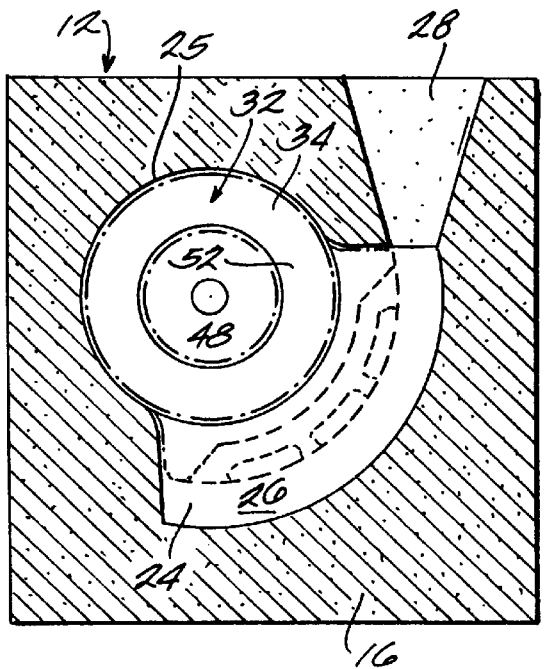
FIG. 2 is a cross sectional view of the mold along line 2—2 of FIG. 1.

Referring to FIG. 2, the cavity 24 is shown with an inner portion of a sector gear, or hub 32, inserted within the cavity 24. The hub 32 fits snugly into a first portion 25 of the cavity 24 while leaving a second portion 26 of the cavity 24 unfilled or open when the hub 32 is placed in the cavity 24. The open portion 26 of the cavity 24 is shaped such that molten material can be poured therein and the molten material can harden and be mechanically bonded to the hub 32, as will be discussed later. Before a detailed description of the method of forming the cast composite sector gear is described, however, a description of the components of the composite sector gear will be discussed.

Figure 3:
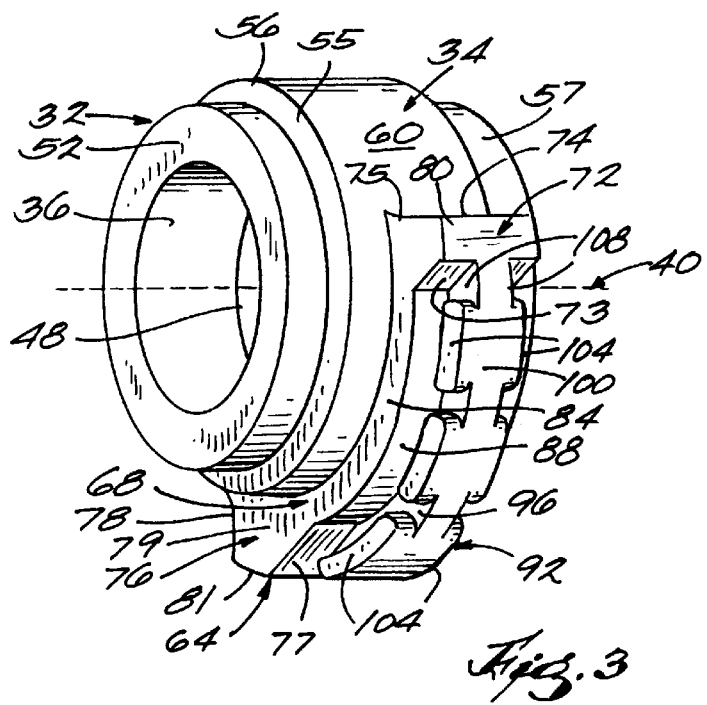
FIG. 3 is a perspective view of the hub.

Referring now to FIGS. 3–5, one embodiment of the hub 32 is illustrated. The hub 32 includes a generally annularly shaped base portion 34. The base portion 34 includes a counter bore 36 that is formed about axis 40 and that extends partially through the width of the base 34. A bore 44 that is smaller than the counter bore 36 is also formed about axis 40 and extends through the remaining width of the base 34. An inner shoulder 48 is formed where the bore 44 and counter bore 36 meet.

Generally planar first and second outer faces, 52 and 54, define the opposed peripheral faces of the base 34. The base 34 also includes a first bearing surface 56 and a second bearing surface 58. A first shoulder 55 is formed and disposed between the first outer face 52 and the first bearing surface 56, and a second shoulder 57 is formed and disposed between the second outer surface 54 and the second bearing surface 58. The base 34 also includes an outer periphery surface 60.

As seen in FIGS. 3–5, the iron hub 32 includes a radially extending gear foundation 64. The gear foundation 64 extends circumferencially from the peripheral surface 60 about a portion of the base 34, and is generally arcuate in shape. The gear foundation 64 is generally narrower than the width of the peripheral surface 60. The gear foundation 64 includes an inner portion 68. The inner portion 68 includes opposed inner portion faces 84 and an inner portion peripheral surface 88. The inner portion peripheral surface 88 is smooth and generally arcuate in shape.

The gear foundation 64 also includes an outer portion 92 that extends circumferencially from a portion of the peripheral surface 88, and is also generally arcuate in shape. The width of the outer portion 92 is generally narrower than the width of the inner portion 68. The outer portion 92 includes opposed outer portion faces 96 and an outer portion peripheral surface 100. The outer portion opposed faces 96 include lugs 104 extending axially therefrom. The illustrated embodiment includes three lugs 104 extending from each of the two faces 96. It should be understood that the number of lugs 104 may vary, and need not be limited to three lugs per face 96. The lugs 104 are somewhat arcuate and oblong in shape. The curvature and shape of the lugs 104 is smooth so as to avoid stress concentration of the finished composite sector gear and to ensure complete fill of the space when the outer portion of the gear is cast onto the hub 32, as will be discussed below. Gaps 108 are formed between each of the lugs 104.

The gear foundation further includes a first end stop 72 and a second end stop 76 located at opposing ends of the gear foundation 64. The end stops 72 and 76 extend from the peripheral surface 60 about a portion of the base 34. The end stops 72 and 76 are mirror images of one another and are integral with and are generally the same width as the inner portion 68. Each end stop 72 and 76 includes an inner face 73 and 77, an outer face 74 and 78, opposed outer surfaces 75 and 79, and a peripheral surface 80 and 81, respectively. The opposed outer surfaces 75 and 79 are generally integral with and within the same plane as the inner portion faces 84. Each peripheral surfaces 80 and 81 are integral with and are a continuation of the arcuate shaped outer portion peripheral surface 100. The outer portion 92 extends circumferencially from the inner surface 73 of the first end stop 72 to the inner surface 77 of the second end stop 76 in a generally arcuate manner. Gaps 108 are formed between each of the outer lugs 104 and the end stops 72 and 76.

Referring to FIG. 4, the end stop inner face 73 forms an acute angle A with the peripheral surface 100, and end stop inner face 77 forms an acute angle B with the peripheral surface 100. Generally, angles A and B are about 45°. Additionally, end stop inner face 73 forms an obtuse angle C with the peripheral surface 88, and end stop inner face 77 forms an obtuse angle D with the peripheral surface 88. Generally, angles C and D are about 135°. These angles, and the orientation of the components of the gear foundation are important to ensure an even flow of molten material into the mold to form the sector gear, to avoid creating air pockets, and to avoid stress concentration in the sector gear.

The entire hub 32 is preferably made of grey iron. Other materials may be suitable for use as the hub depending upon the application for which the sector gear will be used and the type of material used for the other portions of the sector gear 110. The hub 32 is shaped into the requisite form by methods generally know in the art. These methods may differ depending upon the type of material of which the hub is made. In the illustrated embodiment, the grey iron hub is cast into the requisite shape. It should be understood that the hub 32 may be different in size and shape from the embodiment illustrated, depending upon the application for which the finished sector gear will be used.

FIGS. 6 and 7 illustrates a sector gear 110 wherein an outer gear section 112 is cast onto the hub 32 to form a mechanical bond between the hub 32 and the gear section 112. The gear section 112 envelopes the outer portion 92 of the gear foundation 64 such that a mechanical bond is formed to hold the outer gear section 112 in place in relation to the iron hub 32. The gear section 112 is cast onto the gear foundation 64 such that it envelopes the outer portion 92, including the lugs 104, the faces 96, and the peripheral surface 100. In addition to enveloping the outer portion 92, the gear section 112 is in solid contact with the peripheral surface 88, and both end stops 72 and 76.

Because the invention relates to sector gears, the gear section 112 extends only about a portion of the peripheral surface 60 of the hub 32. Additionally, the gear section 112 extends circumferencially about a portion of the gear foundation, and is generally arcuate in shape. In the illustrated embodiment, the angle of the arc is about 90°. In other embodiments, the angle of the arc is less than about 180°.

The width of the gear section 112 is generally the same as the width of the inner portion 68 and the end stops 72 and 76. The gear section 112 includes opposed faces 116. The opposed faces 116 are generally in the same plane as the opposed inner portion faces 84, and the opposed outer surfaces 75 and 79 of the end stops 72 and 76. The gear section further includes ends, or outer faces 118 and 119. Outer faces 118 and 119 are generally in the same plane as outer faces 74 and 78 respectively. The gear section 112 further includes a peripheral surface 120 that can be machined to form the cogs or teeth (not shown) of the sector gear 110.

In the illustrated embodiment, the gear section 112 is made of bronze. The bronze is cast onto the grey iron hub 32 and shaped through sand casting, as discussed below. Materials other than bronze may be suitable for use as the gear section 112 depending upon the application for which the composite sector gear 110 will be used and the type of material used for the other portions of the composite sector gear 110.

The invention also includes a method for the formation for the composite sector gear 110. Generally, the method involves attaching the gear section 112 onto the gear foundation 64 of the hub 32 through casting. As used herein, the terms "cast" or "casting" mean any such methods of giving a substance a particular shape by pouring a liquid or plastic form of the material into a mold and letting or causing the material to harden.

More specifically, the method of the present embodiment includes providing a grey iron hub 32 that includes a gear foundation. For example, a hub such as the one discussed and illustrated above. The hub 32 is then pre-heated in an oven to a temperature between about 200° F. and about 450° F. Preferably, the hub is preheated to a temperature between about 300° F. and about 400° F., and more preferably to a temperature of about 375° F. The hub 32 is then removed from the oven, and treated with an acetylene torch to leave a coating of carbon, or lamp black, on the hub 32. It should be noted that there are many other methods generally known for depositing the layer of carbon on the hub 32. The hub 32 is then placed into the mold 12 as depicted in FIG. 2.

The mold 12 is then oriented such that air and impurities can escape the cavity as the molten bronze is poured into the cavity. In the illustrated embodiment, the mold is oriented such that the feeding channel 28 opens upwardly from the cavity and the peripheral surface 81 of the second end stop 76 is generally perpendicular to the gravitational force of the earth. Molten bronze is poured through the feeding channel 28, and into the open portion 26 of the cavity 24. As more bronze is poured, the bronze begins to fill the open portion 26 and envelopes the outer portion 92 of the gear foundation 64. The carbon coating on the hub 32 provides a barrier between the hub 32 and the bronze to prevent casting defects that may occur due to impurities or corrosion on the hub 32 that may volatilize during casting if such impurities were to contact the molten bronze. The smooth curvature of the peripheral surfaces 88, 100, 80, and 81, the orientation of the mold, and the angle of the end stop inner faces 73 and 77, allow air and impurities to escape from the open portion 26 of the cavity 24 as the molten bronze fills the open portion 26 of the cavity 24. As the bronze is poured, these angles, the orientation of the mold, and the placement of the components of the gear foundation ensure an even flow of molten material into the mold to form the sector gear. The even flow of the bronze into the mold avoids the creation of air pockets, avoids areas of stress concentration in the sector gear, and allows for an even and homogeneous distribution of bronze within the mold. The bronze is poured into the feeding channel until the open portion 26 of the cavity is filled with bronze.

The bronze is then allowed to cool until the bronze solidifies in the shape created by the open portion 26 of the mold 12. The mold 12 can then be removed, leaving a composite sector gear such as the one depicted in FIGS. 6 and 7, and as discussed above.

It should be understood that the method of casting the gear section 112 into position such that it is securely attached to the hub 32 may vary depending upon the types of materials used. As stated above, the terms "cast" or "casting" mean any such methods of giving a substance a particular shape by pouring a liquid or plastic form of the material into a mold and letting or causing the material to harden. Generally, methods used involve providing a prefabricated hub 32 made of a first material and a second different material to be used as the gear section 112, and casting the second material onto the hub 32 to form the gear section 112 onto the hub 32. As discussed above, the hub 32 is fashioned such that a secure mechanical bond is formed between the hub 32 and the gear section 112 when the gear section 112 is formed around the outer portion 92 of the gear foundation 64. Other methods of casting the gear section onto the hub are known, and can be used in practicing the invention. For example, the gear section may be attached to the hub through die casting, injection molding, and many other methods generally known.

Various features of the invention are set forth in the following claims.

I claim:

1. A composite sector gear comprising:
    a hub made of a first material, said hub including a generally annularly shaped base which includes an outer peripheral surface, said hub further including a gear foundation which radially extends about less than the entire outer peripheral surface of said base, said gear foundation including at least one lug and opposing end stops, said hub further including a pair of outwardly extending outer faces which at least partially define said gear foundation; and a gear section cast onto said gear foundation of said hub such that said gear section envelopes said lug and is disposed between said end stops, said gear section having a pair of spaced apart ends such that said ends are generally coplanar with said respective outer faces, and said gear section being made of a second material different from said first material.

2. A composite sector gear as in claim 1, wherein said first material is iron and said second material is bronze.

3. A composite sector gear as in claim 1, wherein said gear foundation includes an inner peripheral surface, and each end stop includes an inner face such that each end stop inner face forms an obtuse angle with said gear foundation peripheral surface.

4. A composite sector gear as in claim 3, wherein each obtuse angle is about 135 degrees.

5. A composite sector gear comprising:
a hub including a base having a peripheral surface and a gear foundation that extends circumferencially from the peripheral surface about less than the entire peripheral surface of said base, said gear foundation including at least one lug and opposing end stops, said gear foundation further including a pair of spaced apart outer faces, said hub being made of a first material; and a gear section cast onto said gear foundation such that said gear section envelopes said lug, said gear section having a pair of spaced apart ends, and said gear section extending circumferencially about a portion of said hub such that said ends are generally coplanar at said respective outer faces, said gear section being made of a second material different from said first material.

6. A composite sector gear as in claim 5, wherein said first material is iron and said second material is bronze.

7. A composite sector gear as in claim 5, wherein said gear foundation includes an inner peripheral surface, and each end stop includes an inner face such that each end stop inner face forms an obtuse angle with said gear foundation peripheral surface.

8. A composite sector gear as in claim 7, wherein each obtuse angle is about 135 degrees.

9. A composite sector gear prepared by a method comprising the steps of:
providing a hub made of a first material, said hub including a generally annularly shaped base which includes an outer peripheral surface, and said hub further including a gear foundation which radially extends about less than the entire outer peripheral surface of said base, said gear foundation including at least one lug and opposing end stops, said hub further including a pair of outwardly extending spaced apart outer faces which at least partially define said gear foundation; and casting onto said gear foundation of said hub a gear section made of a second material different from said first material such that said gear section envelopes said lug and between said end stops, said gear section having a pair of spaced apart ends which are respectively generally coplanar with said outer faces.

10. A composite sector gear as in claim 9, wherein said hub includes iron and said gear section includes bronze, and said casting step includes sand casting said bronze gear section onto said iron hub.

11. A composite sector gear as in claim 9, wherein said casting step includes:
placing said hub in a casting mold having a cavity therein such that a portion of said cavity is left open, and a portion of said hub is exposed to said open portion of said cavity;

orienting said mold and said hub such that molten material may be poured into the open portion and such that air and impurities can escape from said cavity as molten material is poured into said cavity;

pouring molten material into said open portion, said molten material being different from said first material;

allowing said molten material to harden to form a mechanical bond with said hub.

12. A composite sector gear as in claim 9, further providing that said gear foundation includes an inner peripheral surface, and each end stop includes an inner face such that each end stop inner face forms an obtuse angle with said gear foundation peripheral surface.

13. A composite sector gear as in claim 12, further providing that each obtuse angle is about 135 degrees.

14. A composite sector gear prepared by a method comprising the steps of:
providing a hub made of a first material, said hub including a base which includes a peripheral surface and a peripherally extending gear foundation that extends about less than the entire peripheral surface of of said base, said gear foundation including at least one lug and opposing end stops, said gear foundation further including a pair of spaced apart outer faces; and casting onto said gear foundation a gear section having a pair of spaced apart ends and made of a second material different from said first material such that said gear section envelopes said lug between said end stops, and such that said ends are generally coplanar with said respective outer faces.

15. A composite sector gear as in claim 14, wherein said casting step is performed through sand casting.

16. A composite sector gear as in claim 14, wherein said casting step includes:
placing said hub in a sand casting mold having a cavity therein such that said gear foundation is exposed to an open portion of said cavity;

orienting said mold and said hub such that air and impurities can escape from said open portion as molten material is poured into said open portion;

pouring molten material into said open portion, said molten material being different from said first material;

allowing said molten material to harden to form a mechanical bond with said gear foundation.

17. A composite sector gear as in claim 16, wherein prior to said placing step, further includes the steps of:
pre-heating the hub, and
depositing a coating of carbon on the hub.

18. A composite sector gear as in claim 14, further providing that said gear foundation includes an inner peripheral surface, and each end stop includes an inner face such that each end stop inner face forms an obtuse angle with said gear foundation peripheral surface.

19. A composite sector gear as in claim 18, further providing that each obtuse angle is about 135 degrees.

20. A method for producing a composite sector gear comprising the steps of:
providing a hub made of a first material, said hub including a generally annularly shaped base which includes an outer peripheral surface, and said hub further including a gear foundation which radially extends about less than the entire outer peripheral surface of said base, said gear foundation including at least one lug and opposing end stops, said hub further including a pair of outwardly extending spaced apart outer faces which at least partially define said gear foundation; and casting onto said gear foundation of said hub a gear section having a pair of spaced apart ends and made of a second material different from said first material such that said gear section envelopes said lug between said end stops, and such that said ends are generally coplanar to said respective outer faces.

21. A method as in claim 20 wherein said casting step includes the steps of:

placing said hub in a casting mold having a cavity therein such that a portion of said cavity is left open and a portion of said hub is exposed to said open portion of said cavity;

orienting said mold and said hub such that air and impurities can escape from said open portion as molten material is poured into said open portion;

pouring molten material into said open portion, said molten material being different from said first material;

allowing said molten material to harden to form a mechanical bond with said hub.

22. A method as in claim 21 wherein said casting step further includes, prior to said placing step, the steps of:

pre-heating the hub, and depositing a coating of carbon on the hub.

23. A method as in claim 20, wherein said gear foundation further includes an inner peripheral surface, and each end stop includes an inner face such that each end stop inner face forms an obtuse angle with said gear foundation peripheral surface.

24. A method as in claim 23, further providing that each obtuse angle is about 135 degrees.

25. A composite sector gear comprising:

a hub made of a first material, said hub including a base and a peripherally extending gear foundation that extends about a portion of said base, wherein said gear foundation includes an inner peripheral surface and at least one lug and opposing end stops, wherein each end stop includes an inner face such that each end stop inner face forms an obtuse angle with said gear foundation peripheral surface; and a gear section cast onto said hub, said gear section having a pair of spaced apart ends, said gear section being made of a second material different from said first material, wherein said gear foundation supports said gear section, and wherein a portion of said gear section envelopes said lug and is disposed between said end stops.

* * * * *

UNITED STATES PATENT AND TRADEMARK OFFICE
CERTIFICATE OF CORRECTION

PATENT NO : 6,058,794
DATED : May 9, 2000
INVENTOR(S): Chad C. Hempel It is certified that error appears in the above-identified patent and that said Letters Patent is hereby corrected as shown below:

Claim 5, column 7, line 32, delete "at" and insert --with--.

Signed and Sealed this

Twentieth Day of March, 2001

Attest:

NICHOLAS P. GODICI

*Attesting Officer*     *Acting Director of the United States Patent and Trademark Office*